US011136082B2

(12) United States Patent
Pruitt et al.

(10) Patent No.: US 11,136,082 B2
(45) Date of Patent: Oct. 5, 2021

(54) BICYCLE SADDLE WITH MULTI-DENSITY ZONES

(71) Applicant: Specialized Bicycle Components, Inc., Morgan Hill, CA (US)

(72) Inventors: Andrew Lee Pruitt, Superior, CA (US); Jason Lee Walton, Draper, UT (US); Jacqueline Kimberly Koehn, Littleton, CO (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 16/841,295

(22) Filed: Apr. 6, 2020

(65) Prior Publication Data

US 2020/0231237 A1 Jul. 23, 2020

Related U.S. Application Data

(63) Continuation of application No. 15/849,290, filed on Dec. 20, 2017, now Pat. No. 10,633,048.

(51) Int. Cl.
*B62J 1/00* (2006.01)
*B62J 1/26* (2006.01)

(52) U.S. Cl.
CPC ............... *B62J 1/007* (2013.01); *B62J 1/002* (2013.01); *B62J 1/005* (2013.01); *B62J 1/26* (2013.01)

(58) Field of Classification Search
CPC ............. B62J 1/007; B62J 1/005; B62J 1/002
See application file for complete search history.

(56) References Cited

U.S. PATENT DOCUMENTS 5,011,222 A 4/1991 Yates et al.
5,165,752 A * 11/1992 Terry ........................ B62J 1/18
297/202

(Continued)

FOREIGN PATENT DOCUMENTS

CN 204341269 U 5/2015
DE 102011057020 A1 6/2013
(Continued)

OTHER PUBLICATIONS

European Patent Office Action for Application No. 18213320.7-1013 dated Apr. 16, 2019 (10 pages).

(Continued)

*Primary Examiner* — Philip F Gabler
(74) *Attorney, Agent, or Firm* — Michael Best & Friedrich LLP

(57) ABSTRACT

A bicycle saddle comprising a base, a rear portion positioned on the base, and a front portion positioned on the base. The rear portion supports the sit bones of the rider and includes a first resilient material having a first hardness (e.g., 45-55 Shore C), and the front portion supports the genitalia of the rider and includes a second resilient material having a second hardness (e.g., 35-45 Shore C) less than the first hardness. The front portion includes side portions having a first thickness above a highest part of the side sections, and the side portions are separated by a central portion having a second thickness less than the first thickness. Preferably, a lower surface of the central portion is substantially unsupported to form a trampoline-like structure. The upper surface of the central portion can include memory foam and is substantially flush with upper surfaces of the side portions.

23 Claims, 3 Drawing Sheets

(56) References Cited

U.S. PATENT DOCUMENTS

| | | | |
|---|---|---|---|
| 5,645,315 A | 7/1997 | Walker et al. | |
| 5,720,518 A | 2/1998 | Harrison | |
| 6,106,059 A | 8/2000 | Minkow et al. | |
| 6,149,230 A | 11/2000 | Bontrager | |
| 6,254,180 B1 | 7/2001 | Nelson | |
| 6,290,794 B1 | 9/2001 | Yates | |
| 6,371,554 B1 | 4/2002 | Ko | |
| 6,450,572 B1 | 9/2002 | Kuipers | |
| 7,341,308 B2 | 3/2008 | Milton | |
| 7,661,757 B2 | 2/2010 | Chuang | |
| 7,699,392 B2 | 4/2010 | Chuang | |
| 9,233,725 B2 | 1/2016 | Marcel | |
| 9,688,330 B2 | 6/2017 | Schiavon et al. | |
| D847,522 S * | 5/2019 | Pruitt | D6/354 |
| 10,633,048 B2 * | 4/2020 | Pruitt | B62J 1/002 |
| 2003/0025364 A1 | 2/2003 | Antonio | |
| 2007/0176472 A1 * | 8/2007 | Chuang | B62J 1/007 297/202 |
| 2009/0212608 A1 | 8/2009 | Rinard et al. | |
| 2018/0057089 A1 * | 3/2018 | Toll | B62J 1/08 |
| 2019/0061850 A1 * | 2/2019 | Sung | B32B 27/065 |

FOREIGN PATENT DOCUMENTS

| | | |
|---|---|---|
| DE | 202017106247 U1 | 11/2017 |
| EP | 0721880 A1 | 7/1996 |
| EP | 1862382 A1 | 12/2007 |
| WO | 2011148272 A1 | 12/2011 |

OTHER PUBLICATIONS

Extended Search Report issued from the European Patent Office for related Application No. 21173004.9 dated Jul. 29, 2021 (13 Pages).

* cited by examiner

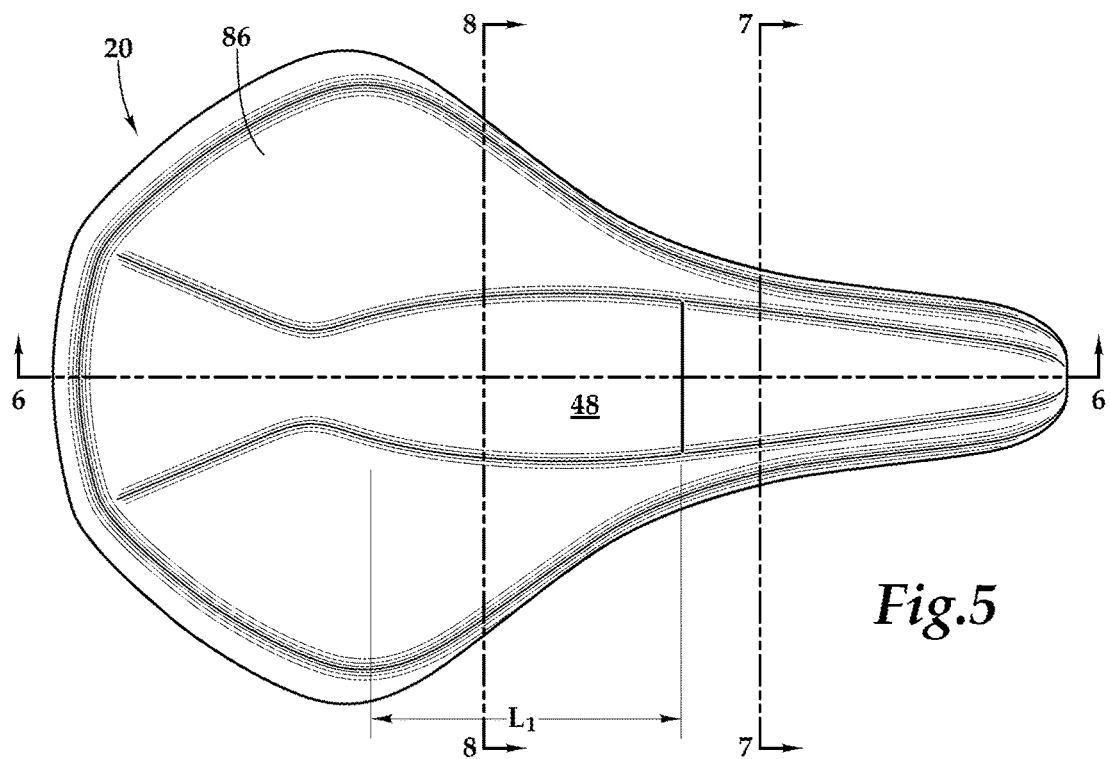
Fig.5
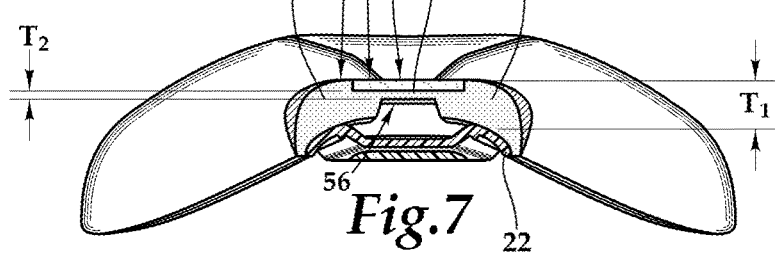
Fig.6
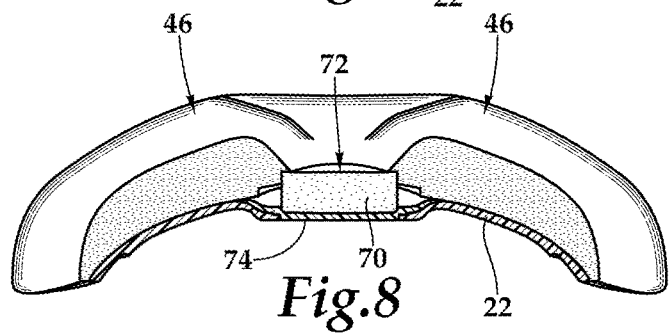
Fig.7
Fig.8

BICYCLE SADDLE WITH MULTI-DENSITY ZONES

CROSS-REFERENCE TO RELATED APPLICATIONS

This application is a continuation of U.S. application Ser. No. 15/849,290, filed Dec. 20, 2017, the entire contents of which are incorporated herein by reference.

BACKGROUND

The present invention relates generally to the field of bicycle saddles and specifically to bicycle saddles designed with different zones for supporting a rider.

Bicycle saddles are commonly designed with anatomical features to comfortably support a rider. These features are important to enhance the comfort and performance of the rider.

The differences in the anatomy between male and female riders often demand different saddle designs to enhance rider comfort and performance. For example, the average female rider has a wide pelvis and wider ischial tuberosities, commonly called "sit bones," and thus saddles for female riders are often slightly wider than those for male riders.

It can be appreciated that there are other anatomical differences between male and female riders in the area that contacts a bicycle saddle, and thus further saddle refinements can be made to further enhance rider comfort and performance.

SUMMARY

The present invention provides a bicycle saddle comprising a base having a rear section and a front section, a rear portion positioned on the rear section, and a front portion positioned on the front section. The rear portion supports the sit bones of the rider and includes a first resilient material having a first hardness (e.g., 45-55 Shore C), and the front portion supports the genitalia of the rider and includes a second resilient material having a second hardness (e.g., 35-45 Shore C) less than the first hardness. The front portion includes side portions positioned on side segments of the front section. The side portions having a first thickness above a highest part of the side sections, and the side portions are separated by a central portion having a second thickness less than the first thickness.

Preferably, a lower surface of the central portion is substantially unsupported to form a trampoline-like structure. In one embodiment, the upper surface of the central portion includes memory foam and is substantially flush with upper surfaces of the side portions. The front portion preferably has a front length that is at least 20% of an overall length of the saddle.

The front portion and the rear portion can advantageously meet at a transition zone, that has a length that is at least 5% of the overall length of the saddle. Preferably, the transition zone defines a transition plane that is oriented at an angle of 20 degrees to 70 degrees relative to horizontal.

In another aspect, the invention provides a bicycle saddle comprising a resilient support having side portions for supporting the sit bones of the rider, the side portions being separated by a central recess. The saddle further comprises a central pad positioned in the central recess between the side portions, the central pad comprising memory foam (e.g., having a hardness of about 9-19 Shore E). Preferably, the central pad has an upper surface that is recessed relative to the upper surfaces of the side portions. The central pad can have a length that is between 20% and 50% of the overall length of the saddle and preferably spans a middle of the saddle.

In one embodiment, the resilient support comprises a rear portion for supporting the sit bones of the rider, the rear portion comprising a first resilient material having a first hardness (e.g., at least 45 Shore C), and a front portion for supporting the genitalia of the rider, the front portion comprising a second resilient material having a second hardness (e.g., less than 45 Shore C) less than the first hardness. The front portion includes side portions having a first thickness, the side portions being separated by a central portion having a second thickness less than half the first thickness.

Other aspects of the invention will become apparent by consideration of the detailed description and accompanying drawings.

BRIEF DESCRIPTION OF THE DRAWINGS

FIG. 5 is an exploded perspective view of the saddle of FIG. 2 with the cover omitted.

FIG. 6 is a section view taken along the line 6-6 in FIG. 4.

FIG. 7 is a section view taken along the line 7-7 in FIG. 4.

FIG. 8 is a section view taken along the line 8-8 in FIG. 4.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
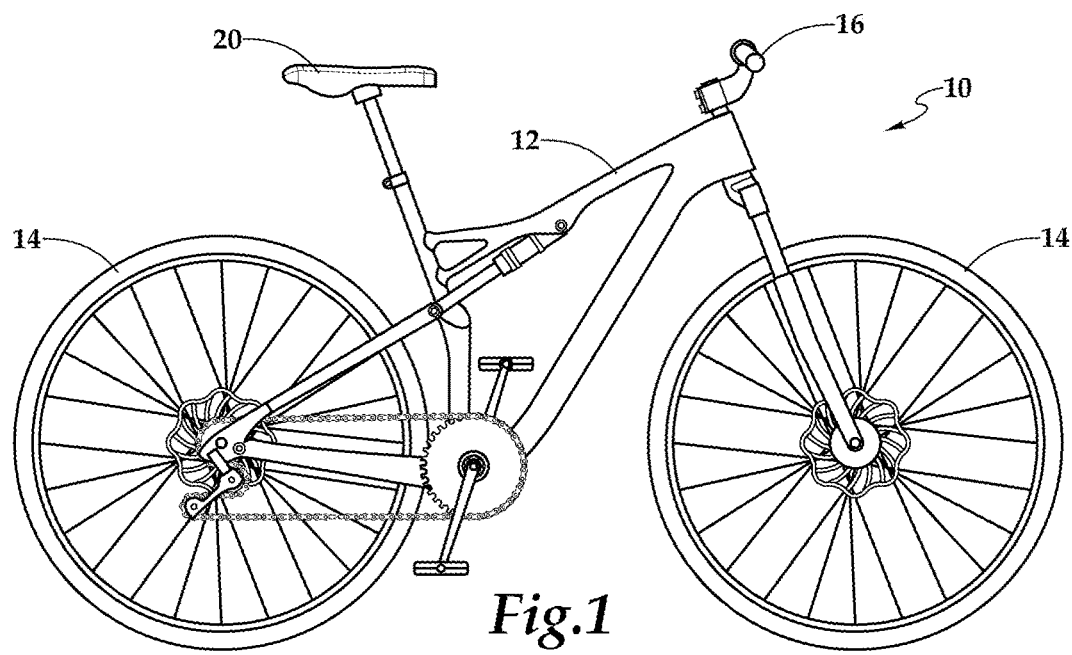
FIG. 1 is a side view of a bicycle including a bicycle saddle embodying the invention.
Figure 2:
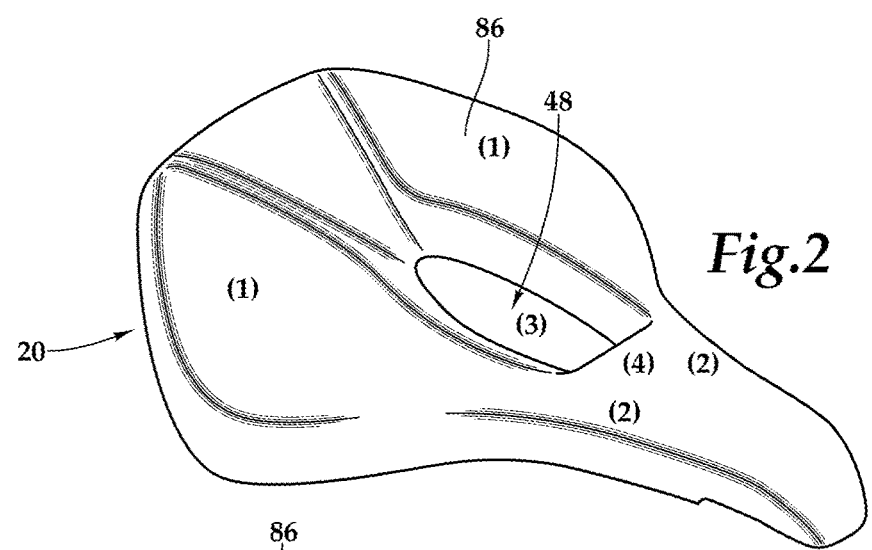
FIG. 2 is a right front perspective view of the saddle of FIG. 1.

FIG. 1 shows a bicycle 10 having a frame 12 support on two wheels 14, handlebars 16 for steering the bicycle, and a saddle 20 for the rider to sit on while riding the bicycle 10.

The saddle 20 includes a base 22 supported on two rails 24, as is generally known in the art. The illustrated base 22 comprises a relatively stiff molded plastic material, such as carbon fiber reinforced nylon. The rails 24 are made of stainless steel and co-molded into the base 22. The base 22 includes a rear section 26 and a front section 28. The rear section 26 includes a cutout 300 that is about 75 m long and 30 mm wide. The front section 28 is further divided into side segments 32 separated by a central segment 34.

The saddle 20 further includes a resilient support 40 positioned on the base 22 and designed to resiliently support a rider. The illustrated resilient support 40 is divided into a rear portion 42 and a front portion 44 comprising different materials. The rear portion 42 includes an upper support surface 46 positioned to support the sit bones of the rider. The rear portion 42 further includes a rear recess 48 having a recess length, which in the illustrated embodiment is about 73 mm. The rear portion 42 comprises a first resilient material including ethylene-vinyl acetate (EVA) having a first hardness of at least 45 Shore C (preferably at least 50 Shore C). In one embodiment, the first resilient material has a hardness of 55 Shore C.

The illustrated front portion 44 includes side portions 50 separated by a central portion 52. The side portions 50 and central portion 52 cooperatively define a front recess 54 in the front portion 44. The side portions 50 are supported by the side segments 32 of the base 22 and have a first thickness T1 above a highest point of the side segments 32. The central portion 52 has a second thickness T2 less than the first thickness T1. For example, T1 is about 2 mm and T2 is about 10 mm. As shown in FIGS. 6-7, a bottom surface 56 of the central portion 52 is substantially unsupported or suspended to thereby create a trampoline support. The suspended trampoline support provides proprioceptive support to the clitoral region of the saddle 20 while also allowing for flex and adjustability into space below. With each pedal stroke or bump in the road, the foam can maintain contact with the front, midline regions of the genetalia without putting high pressure or stress which can lead to numbness. The trampoline foam then blends into the thicker region of foam on the side portions, which blend in the part of the rear portion surrounding the rear recess. The thicker regions of the side portions serve to support both the rami of the pelvis as well as the trampoline itself.

The central portion 52 does not extend the full length of the front portion 44, and in the illustrated embodiment the central portion 52 has a central length L2 that is about 50% of a front length L3 of the front portion 44 and about 18% of the overall length L4 of the saddle. For example, in the illustrated embodiment the central portion 52 has a (central) length L2 of about 43 mm compared to the front length L3 of the front portion 44 of about 92 mm, and an overall length L4 of about 244 mm.

The midpoint of the central portion 52 is about 29% of the overall length from the front of the saddle 20. The midpoint and length of the central portion 52 can vary to accommodate different anatomies. For example, for some saddles and anatomies, the midpoint could be from 15% to 45% of the overall length L4 from the front of the saddle 20, and the length L2 of the central portion could be from 5% to 30% of the overall length L4 of the saddle 20.

The front portion 44 comprises a second resilient material including EVA having a second hardness less than the first hardness of the first material of the rear portion. For example, the second hardness can be less than 45 (preferably less than 40 Shore C). In one embodiment the second resilient material has a hardness of 35 Shore C. The approximate 20 Shore C drop from the material of the rear portion 42 to the material of the front portion 44 is specifically designed to match softer foam with the softer tissue of the labia majora and clitoris, which are often pinched or pressed between the middle and front sections of the saddle 20 and the rami of the pelvis when a rider is rotated forward during aggressive riding.

Figure 4:
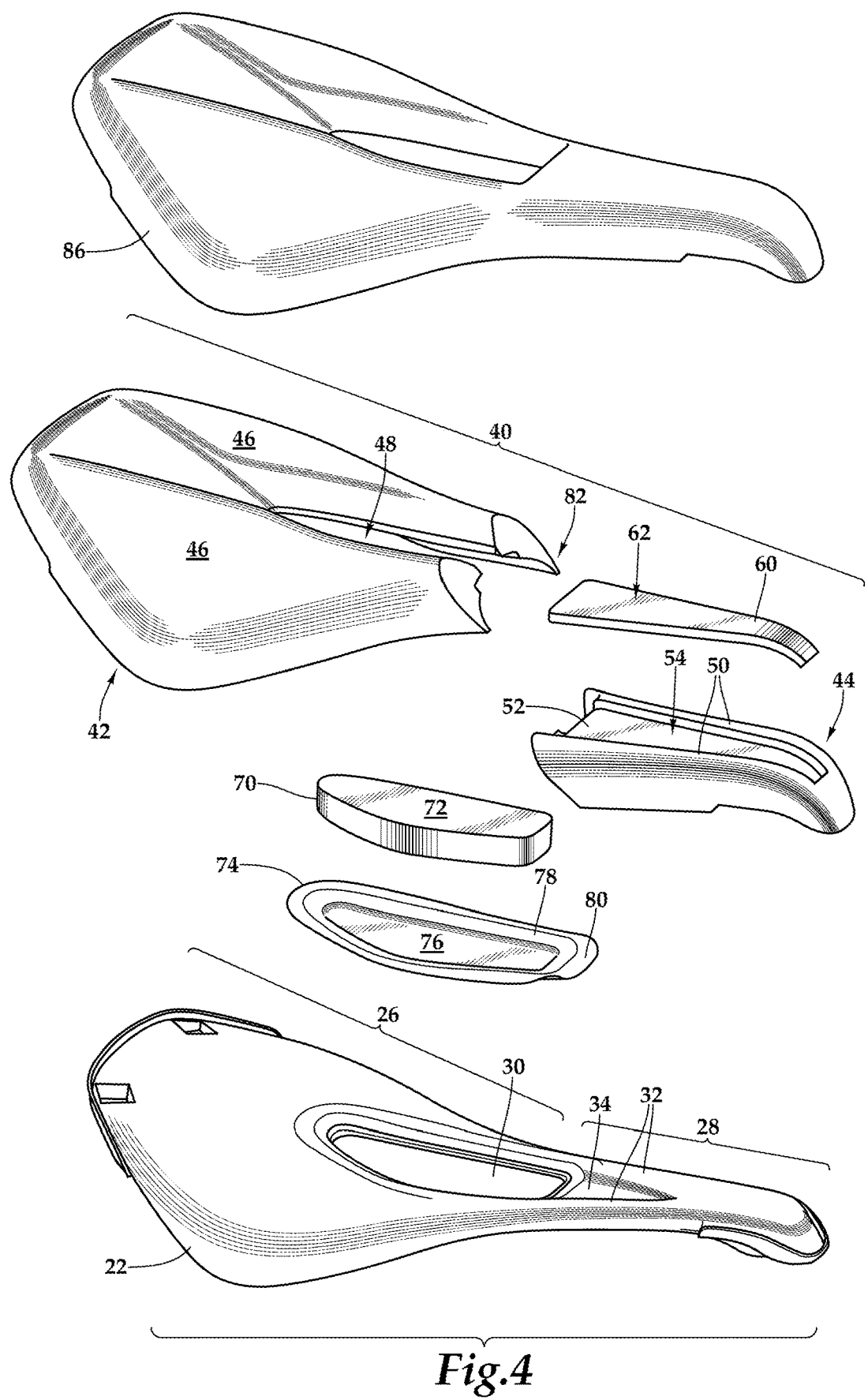
FIG. 4 is a top view of the saddle of FIG. 2.

As best shown in FIGS. 4 and 6-8, the illustrated saddle 20 further includes an upper layer 60 that resides in the front recess 54 formed in the front portion 44 (defined by the side portions 50 and central portion 52). The upper layer 60 comprises a material that is softer than the second resilient material and has a hardness of about 20 to 30 Shore E. In the illustrated embodiment, the upper layer comprises viscoelastic polyurethane foam, or low-resilience polyurethane foam (LRPu), commonly called memory foam, having a thickness of about 3 mm. As shown in FIGS. 4 and 7, the upper layer 60 includes an upper surface 62 that is substantially flush with upper surfaces 64 of the side portions 50 to create a smooth transition between the two.

The bicycle saddle 20 further includes a central pad 70 having an upper pad surface 72 that is recessed about 4 to 7 mm into the rear recess 48 below the upper support surfaces 46 of the rear portion 42. This recess 48 allows for the external genetalia to have a volume in which to sit while still allowing adjustability for riders with thicker or more voluminous genetalia to compress the foam. The central pad 70 comprises memory foam, having a hardness of 9 to 19 Shore E.

Figure 3:
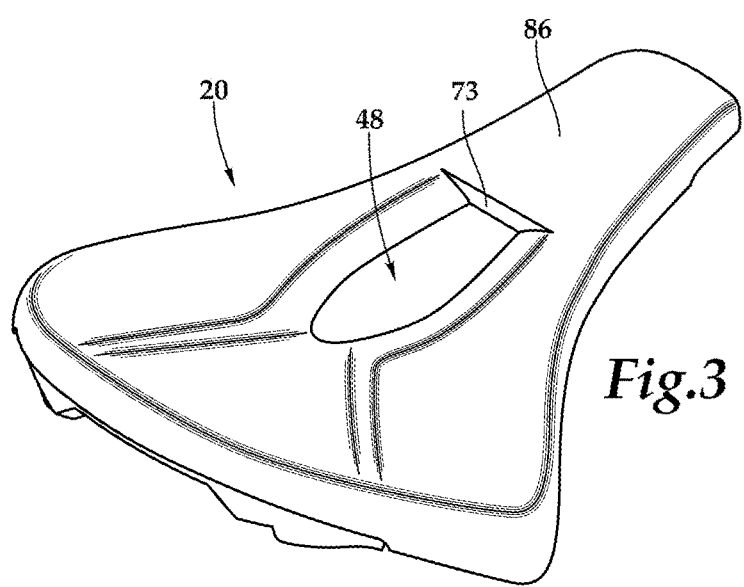
FIG. 3 is a right rear perspective view of the saddle of FIG. 2.

As best shown in FIGS. 3 and 6, the transition from the top of the central portion 52 or upper layer 60 to the upper surface 72 of the central pad 70 involves an abrupt change. Specifically, the illustrated transition occurs at a transition surface 73 that is substantially perpendicular to the upper surface 72 and substantially perpendicular to the upper surface of the central portion 52. Rather than a 90 degree orientation, the transition surface 73 could vary, such as +/−45 degrees.

A pad tray 74 is supported on the base 22 and positioned in the cutout 30 to provide support to a bottom surface of the central pad 70. The pad tray 74 includes a bottom 76, sidewalls 78, and flanges 80, and is preferably made of a material that is more resilient than the material of the base 22. In the illustrated embodiment, the pad tray 74 comprises thermoplastic rubber having a hardness of 10 Shore C.

Referring to FIG. 6, the saddle 20 has an overall length L4 of about 244 mm, the rear portion 42 has a rear length L5 that is more than 50% of the overall length L4, and the front portion 44 has a front length L3 that is less than 50% of the overall length L4. In the illustrated embodiment, the rear length L5 is about 152 mm, and the front length L3 is about 92 mm.

The front portion 44 and rear portion 42 meet at a transition zone 82 that provides for the gradual transition from the harder rear portion 42 to the softer front portion 44. The location of transition of foam from sit bone area to rami area is carefully selected to ensure that a majority of the weight can still be supported by the firmer foam of the rear portion 42. If the foam were transitioned too far towards the rear, the soft foam would compress under the weight of the rider and would lose its pressure relieving effect on the rami. If placed too far forward, it would not provide relief.

The transition zone 82 has a transition length L6 that is at least 5% of overall length L4 of the saddle. In the illustrated embodiment, the transition length L6 is about 18 mm. The illustrated transition zone 82 is characterized by a transition plane 84 that is oriented at an angle of 20 degrees to 70 degrees relative to horizontal. In the illustrated embodiment the transition plane 84 is positioned at an angle of about 40 degrees relative to horizontal.

The illustrated saddle 20 further includes a flexible cover 86 that surrounds the above-described foam parts and provides a water-resistant barrier. The illustrated cover 86 comprises polyurethane, as is known in the art, and is preferably co-molded with the above-described resilient support.

The use of different types of foam, support, and suspension creates four different zones and levels of support to account for the different needs of different tissue which undergoes different stresses depending on the part of the saddle. These four zones are (1) the upper support surface of the rear portion (for supporting the sit bones), (2) the relatively softer side portions of the front portion (for supporting the rami of the pelvis), (3) the recessed central pad (for providing volume to receive external genetalia and comfortably support thicker genetalia, and (4) the central portion or trampoline that provides proprioceptive support to the clitoral region of the saddle.

The make the above-described saddle 20, the base 22 is molded, and the pad tray 74 is either co-molded or otherwise attached to the based (e.g., with adhesive) to form a base assembly. Separately, the cover 86 is vacuum formed in a mold with the outer surface of the cover facing the vacuum-forming surface of the mold. The upper layer 60 of memory foam is then placed into the mold in contact with an inner surface of the cover 86, and the second resilient material (corresponding with the front portion 44 of the resilient support) is poured in liquid form into the mold over the upper layer 60. The first resilient material (corresponding with the rear portion 42 of the resilient support) is then poured in liquid form into the mold in contact with the inner surface of the cover 86. The pre-formed central pad 70 is then placed into the mold, and an upper part of the mold is closed to allow the first and second resilient materials to cure (e.g., under heat) to form a cover assembly. After the cover assembly 86 is cured, it is assembled with the base assembly and rails 24 are added to form a saddle assembly. Portions of the cover can be wrapped onto and adhesively secured to the base 22 to create a finished saddle 20.

Various features of the invention are set forth in the following claims.

The invention claimed is:

1. A bicycle saddle comprising:
    a resilient support having upper support surfaces for supporting sit bones of a rider, the upper support surfaces being separated by a central recess; and
    a central pad positioned in the central recess between the upper support surfaces, the central pad comprising memory foam;
    wherein the central pad has an upper surface exposed to an environment outside the resilient support, wherein the upper surface is recessed relative to each of the upper support surfaces of the resilient support.

2. The bicycle saddle of claim 1, wherein the central pad has a pad hardness of 9 to 19 Shore E.

3. The bicycle saddle of claim 1, wherein the upper surface of the central pad is disposed between 4-7 mm below each of the upper support surfaces of the resilient support.

4. The bicycle saddle of claim 1, wherein the central pad has a length that is between 20% and 50% of an overall length of the bicycle saddle.

5. The bicycle saddle of claim 4, wherein the central pad spans a middle of the bicycle saddle.

6. The bicycle saddle of claim 1, wherein the resilient support comprises:
    a rear portion comprising a first resilient material having a first hardness; and
    a front portion for supporting the genitalia of the rider, the front portion comprising a second resilient material having a second hardness less than the first hardness.

7. The bicycle saddle of claim 6, wherein the front portion includes side portions each having a first thickness, the side portions being separated by a central portion having a second thickness less than half the first thickness.

8. The bicycle saddle of claim 7, wherein a lower surface of the central portion is substantially unsupported.

9. The bicycle saddle of claim 7, wherein the central pad has a first upper surface, and the central portion has a second upper surface, wherein a transition surface extends between the first upper surface of the central pad and the second upper surface of the central portion.

10. The bicycle saddle of claim 9, wherein the transition surface extends perpendicular to the first upper surface of the central pad.

11. The bicycle saddle of claim 9, wherein the transition surface extends perpendicular to the second upper surface of the central portion.

12. The bicycle saddle of claim 9, wherein the transition surface extends at 45 degrees relative to the first upper surface of the central pad and to the second upper surface of the central portion.

13. The bicycle saddle of claim 6, wherein the rear portion includes the upper support surfaces and the central recess, and wherein the central recess is a rear recess in the bicycle saddle.

14. The bicycle saddle of claim 6, wherein the first hardness is at least 45 Shore C and the second hardness is less than 45 Shore C.

15. The bicycle saddle of claim 1, further comprising a base, wherein the resilient support and the central pad are supported by the base.

16. The bicycle saddle of claim 15, wherein the base defines a cutout, and wherein the bicycle saddle includes a pad tray supported on the base and positioned in the cutout.

17. The bicycle saddle of claim 16, wherein the central pad has a bottom surface, and wherein the bottom surface is supported by the pad tray.

18. The bicycle saddle of claim 16, wherein the pad tray includes a bottom, sidewalls, and flanges.

19. The bicycle saddle of claim 16, wherein the base is comprised of a first material and the pad tray is comprised of a second material that is more resilient than the first material of the base.

20. The bicycle saddle of claim 1, further comprising a flexible cover coupled to and covering at least a portion of the resilient support.

21. A bicycle saddle comprising:
    a resilient support having a rear portion and a front portion, wherein the rear portion includes upper support surfaces for supporting sit bones of a rider, the upper support surfaces being separated by a central recess, and wherein the front portion includes a central portion; and
    a central pad positioned in the central recess between the upper support surfaces, the central pad comprising memory foam, wherein the central pad has a first upper surface, and the central portion has a second upper surface, wherein a transition surface extends between the first upper surface of the central pad and the second upper surface of the central portion, thereby defining an abrupt transition between the central pad and the central portion.

22. The bicycle saddle of claim 21, wherein the transition surface extends perpendicular to the first upper surface of the central pad.

23. The bicycle saddle of claim 22, wherein the transition surface extends perpendicular to the second upper surface of the central portion.

* * * * *